US009691352B2

United States Patent
Zhang

(10) Patent No.: US 9,691,352 B2
(45) Date of Patent: Jun. 27, 2017

(54) CONTROL METHOD AND DEVICE THEREOF

(71) Applicant: Lenovo (Beijing) Co., Ltd., Beijing (CN)

(72) Inventor: Xiaodan Zhang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/669,681

(22) Filed: Mar. 26, 2015

(65) Prior Publication Data
US 2016/0071489 A1 Mar. 10, 2016

(30) Foreign Application Priority Data

Sep. 9, 2014 (CN) .......................... 2014 1 0455324

(51) Int. Cl.
*G09G 5/10* (2006.01)
*G06F 3/14* (2006.01)
*G09G 3/00* (2006.01)

(52) U.S. Cl.
CPC ............. *G09G 5/10* (2013.01); *G06F 3/1454* (2013.01); *G09G 3/002* (2013.01); *G09G 2320/0686* (2013.01); *G09G 2360/144* (2013.01)

(58) Field of Classification Search
CPC ............. G09G 2320/0646; G09G 5/10; G09G 2320/0686; G09G 2360/144; G09G 3/002; G06F 3/1454

(Continued)

(56) References Cited

U.S. PATENT DOCUMENTS

2002/0140724 A1\* 10/2002 Qureshi ................ G06F 3/0481
715/730
2002/0196965 A1\* 12/2002 Wallace ................ G06T 7/0012
382/131

(Continued)

FOREIGN PATENT DOCUMENTS

CN 101169585 A 4/2008
CN 101859059 A 10/2010

(Continued)

OTHER PUBLICATIONS

First Chinese Office Action regarding Application No. 201410455324.4 dated Oct. 23, 2015. English translation provided by Unitalen Attorneys at Law.

(Continued)

*Primary Examiner* — Tony Davis
(74) *Attorney, Agent, or Firm* — Harness, Dickey & Pierce, P.L.C.

(57) ABSTRACT

A control method and a device thereof are provided, which are applied to an electronic device. The electronic device includes a display module and a projection module, and is capable of displaying output content through the display module or projecting the output content to a projection screen. The method includes: detecting a state of the projection module; acquiring a current display brightness of the display module as a first display brightness, in the case that it is detected that the projection module is controlled to perform projection; and controlling a display brightness of the display module to switch from the first display brightness to a second display brightness which is lower than the first display brightness.

14 Claims, 5 Drawing Sheets

(58) Field of Classification Search
USPC .............. 345/589, 593, 690, 156, 204, 212, 345/170–176
See application file for complete search history.

(56) References Cited

U.S. PATENT DOCUMENTS

| | | | | |
|---|---|---|---|---|
| 2003/0071894 A1* | 4/2003 | Higuchi | ............... | H04N 7/183 348/65 |
| 2005/0057543 A1* | 3/2005 | Hunt | ............... | G09G 3/002 345/204 |
| 2009/0141037 A1* | 6/2009 | Zhou | ............... | G03B 21/008 345/589 |
| 2009/0262306 A1* | 10/2009 | Quinn | ............... | G06F 1/1616 353/25 |
| 2010/0045569 A1* | 2/2010 | Estevez | ............... | G03B 21/10 345/3.1 |
| 2010/0195064 A1* | 8/2010 | Kim | ............... | G03B 21/14 353/121 |
| 2011/0050663 A1* | 3/2011 | Katahira | ............... | G09G 5/02 345/207 |
| 2011/0149101 A1* | 6/2011 | Kim | ............... | G06K 9/00449 348/222.1 |
| 2011/0169854 A1* | 7/2011 | Hikosaka | ............... | H04N 9/3182 345/589 |
| 2012/0038672 A1* | 2/2012 | Im | ............... | G06F 3/1423 345/636 |
| 2012/0162444 A1* | 6/2012 | Suda | ............... | G06F 3/03545 348/207.1 |
| 2012/0214323 A1* | 8/2012 | Gore | ............... | H04N 9/3173 439/212 |
| 2014/0049493 A1* | 2/2014 | Nojima | ............... | G09G 5/006 345/173 |
| 2014/0085524 A1* | 3/2014 | Berglund | ............... | G09G 5/00 348/333.01 |
| 2014/0293245 A1* | 10/2014 | Tani | ............... | G03B 21/2053 353/85 |
| 2015/0002750 A1* | 1/2015 | Toyooka | ............... | H04N 9/3155 348/779 |
| 2015/0116582 A1* | 4/2015 | Yoshikawa | ............... | H04N 5/2353 348/362 |
| 2015/0138252 A1* | 5/2015 | Okano | ............... | H04N 21/4318 345/690 |
| 2015/0235628 A1* | 8/2015 | Sakai | ............... | G06F 3/1423 345/593 |
| 2016/0100140 A1* | 4/2016 | Hsiao | ............... | H04N 9/3182 353/85 |
| 2016/0148557 A1* | 5/2016 | Hori | ............... | G09G 3/2096 345/212 |

FOREIGN PATENT DOCUMENTS

| | | |
|---|---|---|
| CN | 102023462 A | 4/2011 |
| CN | 102111485 A | 6/2011 |
| CN | 103517019 A | 1/2014 |

OTHER PUBLICATIONS

Third Chinese Office Action regarding Application No. 201410455324.4 dated Aug. 11, 2016. English translation provided by Unitalen Attorneys at Law.

* cited by examiner

CONTROL METHOD AND DEVICE THEREOF

CROSS REFERENCE TO RELATED APPLICATIONS

The present application claims the priority to Chinese Patent Application No. 201410455324.4, entitled "CONTROL METHOD AND DEVICE THEREOF", filed on Sep. 9, 2014 with the State Intellectual Property Office of People's Republic of China, which is incorporated herein by reference in its entirety.

FIELD

The disclosure relates to the field of electronic technology, and particularly to a control method and a device thereof.

BACKGROUND

With the development of electronic technology, electronic devices realize increasingly diversified functions. To better demonstrate display function, electronic devices with a projection module emerge as the times require.

The more realizable functions the electronic devices realize, the higher power consumption it results in. The inventor finds that the electronic devices may have increased power consumption while using the projection module to perform projection, which is not beneficial for development and usage of the electronic devices.

SUMMARY

In an aspect of the present application, a control method, applied to an electronic device including a display module and a projection module is provided. The control method includes:

detecting a state of the projection module;

acquiring a display brightness of the display module as a first display brightness, in the case that it is detected that the projection module is controlled to perform projection; and controlling a display brightness of the display module to switch from the first display brightness to a second display brightness, wherein the second display brightness is lower than the first display brightness.

In another aspect of the present application, an electronic device is provided. The electronic device includes:

a display module for displaying output content;

a projection module for projecting the output content to a projection screen; and a control device configured:

to detect a state of the projection module;

to acquire a display brightness of the display module as a first display brightness in the case that it is detected that the projection module is controlled to perform projection; and to control a display brightness of the display module to switch from the first display brightness to a second display brightness, wherein the second display brightness is lower than the first display brightness.

BRIEF DESCRIPTION OF THE DRAWINGS

To describe the technical solutions for embodiments of the present disclosure or technical solutions in conventional technology more clearly, the following briefly describes the drawings involved in the embodiments of the present disclosure or in the conventional technology. Apparently, the drawings described below are only embodiments of the disclosure, and persons of ordinary skill in the art can derive other drawings according to the drawings without any creative effort.

DETAILED DESCRIPTION

Technical solutions of the embodiments of the present disclosure will be illustrated completely and clearly with the following drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 1:
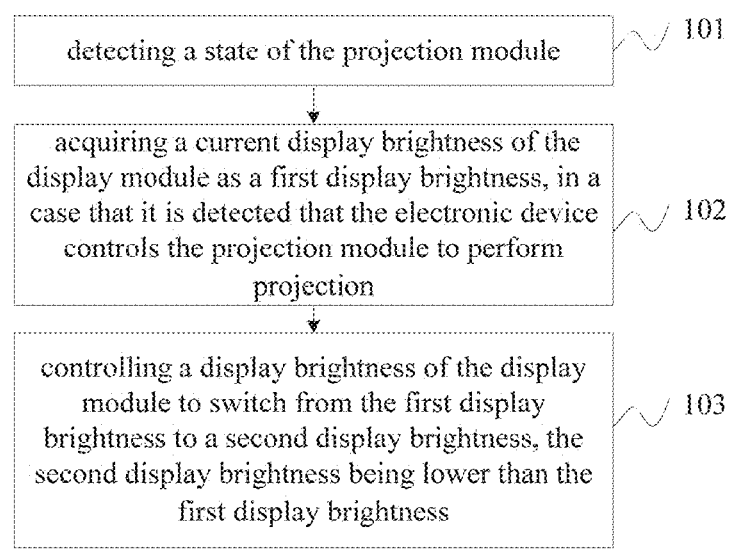
FIG. 1 is a flow chart of a control method according to an embodiment of the disclosure.

FIG. 1 is a flow chart of a control method according to an embodiment of the disclosure. The method is applied to an electronic device. The electronic device includes at least a display module and a projection module, and is capable of displaying output content through the display module or projecting the output content to a projection screen through the projection module.

The method may include the following steps 101 to 103.

Step 101 includes: detecting a state of the projection module.

Step 102 includes: acquiring a current display brightness of the display module as a first display brightness, in the case that it is detected that the electronic device controls the projection module to perform projection.

Step 103 includes: controlling a display brightness of the display module to switch from the first display brightness to a second display brightness, the second display brightness being lower than the first display brightness.

According to the embodiment of the disclosure, it is detected that the electronic device controls the projection module to perform projection, and the first display brightness of the display module is controlled to switch to the second display brightness, which is lower than the first display brightness, to reduce the power consumption for display caused by the display module, thereby enabling the electronic device to operate in the reduced power consumption while the electronic device performs projection.

Figure 2:
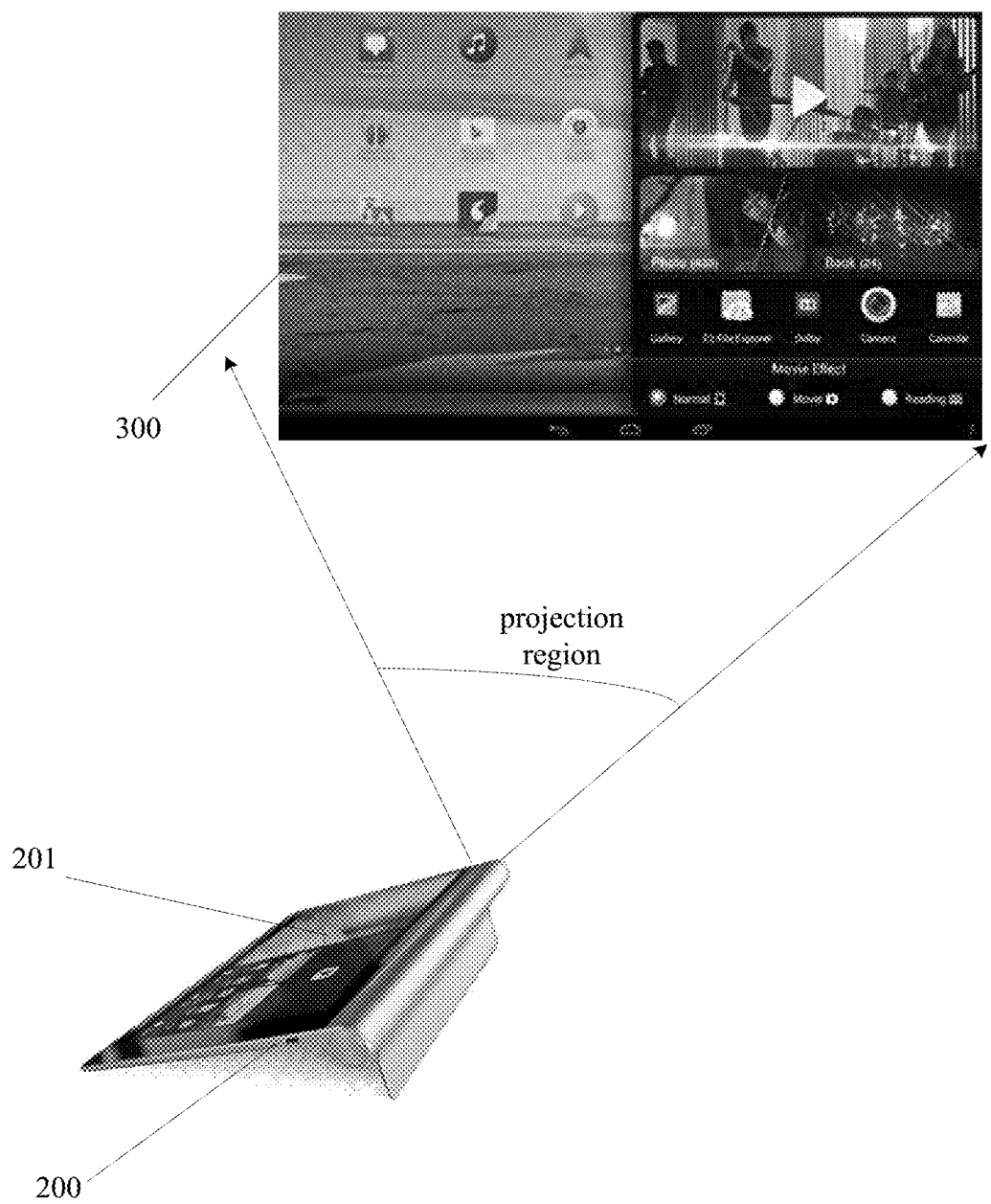
FIG. 2 is a schematic diagram which shows that an electronic device performs projection according to an embodiment of the disclosure.

In practice, the embodiment of the disclosure may be applied to an electronic device as shown in FIG. 2. FIG. 2 shows a schematic diagram in which the electronic device performs display while performing projection. The electronic device 200 includes a display module 201 and a projection module. The projection module is embedded in a side (not shown) of the electronic device. Output content may be projected to a projection screen 300 through the projection module. In conventional technology, display parameters of the display module before the projection module is used are the same as those after the projection module is used, which leads to a huge power consumption of the electronic device. The inventor finds that a user pays more attention to content projected by the projection module while the projection module is used, and pay less attention to display content of the display module. According to the embodiment of the disclosure, the display brightness of the display module while the projection module performs projection is reduced from the current first display brightness to the second display brightness, which is lower than the first display brightness, thereby reducing the power consumption for display caused by the display module and saving the overall power consumption of the electronic device.

The first display brightness may refer to the current display brightness of the display module. The second display brightness may be any display brightness lower than the first display brightness, a display brightness lower than a preset value of the first display brightness, or a preset display brightness lower than the first display brightness.

As a possible implementation, the second display brightness is 0.

Figure 3:
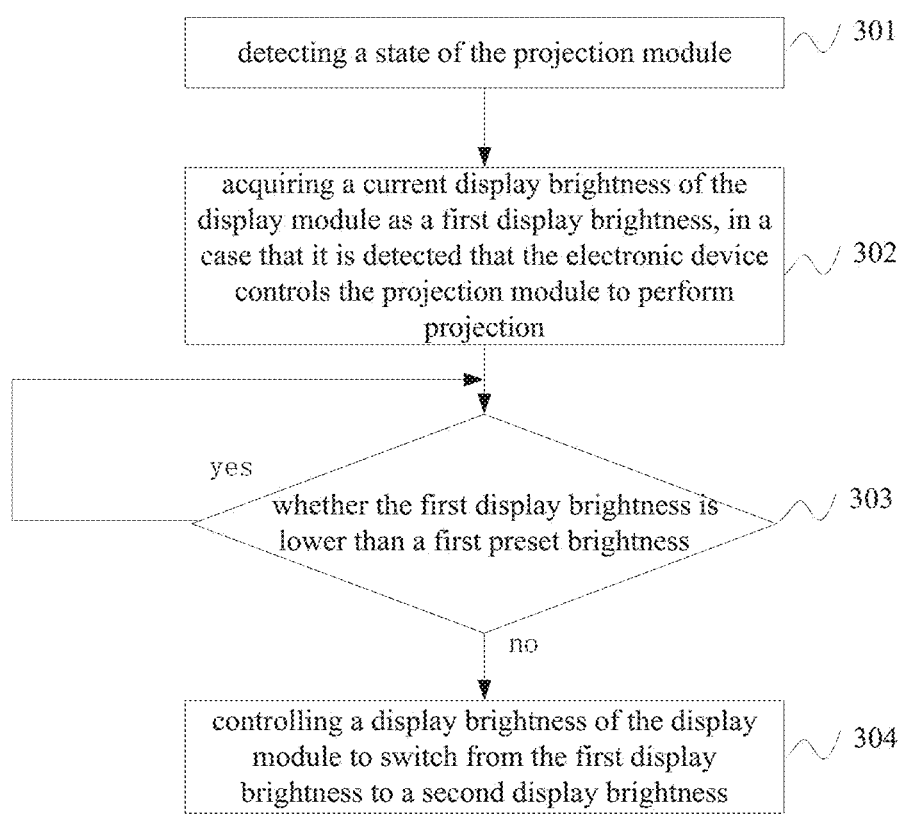
FIG. 3 is a flow chart of a control method according to another embodiment of the disclosure.

To ensure that while the projection module performs projection, the user is still able to view the content of the display module, the first display brightness may be determined first. FIG. 3 is a flow chart of a control method according to another embodiment of the disclosure. The method is applied to an electronic device. The electronic device includes at least a display module and a projection module, and is capable of displaying output content through the display module or projecting the output content to a projection screen through the projection module.

The method may include the following steps 301 to 304.

Step 301 includes: detecting a state of the projection module.

Step 302 includes: acquiring a current display brightness of the display module as a first display brightness, in the case that it is detected that the electronic device controls the projection module to perform projection.

Step 303 includes: determining whether the first display brightness is lower than a first preset brightness, and going to step 304 in the case of negative determination.

Step 304 includes: controlling a display brightness of the display module to switch from the first display brightness to a second display brightness.

The second display brightness is lower than the first display brightness and is lower than the first preset brightness.

The first preset brightness may be determined based on a lowest brightness in which human eyes are able to have visual perception.

According to the embodiment, it is detected that the electronic device controls the projection module to perform projection, and the display brightness of the display module may be controlled to switch from the first display brightness to the second display brightness if the current display brightness of the display module is not lower than the first preset brightness, to reduce the power consumption for display caused by the display module, thereby enabling the electronic device to operate in a saved power consumption for display while the electronic device uses the projection module to perform projection; or, in the case that the first display brightness of the display module is lower than the first preset brightness, the first display brightness of the display module may be maintained, so that a user is able to make out display content of the display module.

A conventional electronic device may automatically adjust the display brightness of the display module according to an ambient brightness. For example, in the case that the ambient brightness is high, the display brightness of the display module is increased, and in the case that the ambient brightness is low, the display brightness of the display module is reduced, so that the user is able to make out display content of the display module.

Figure 4:
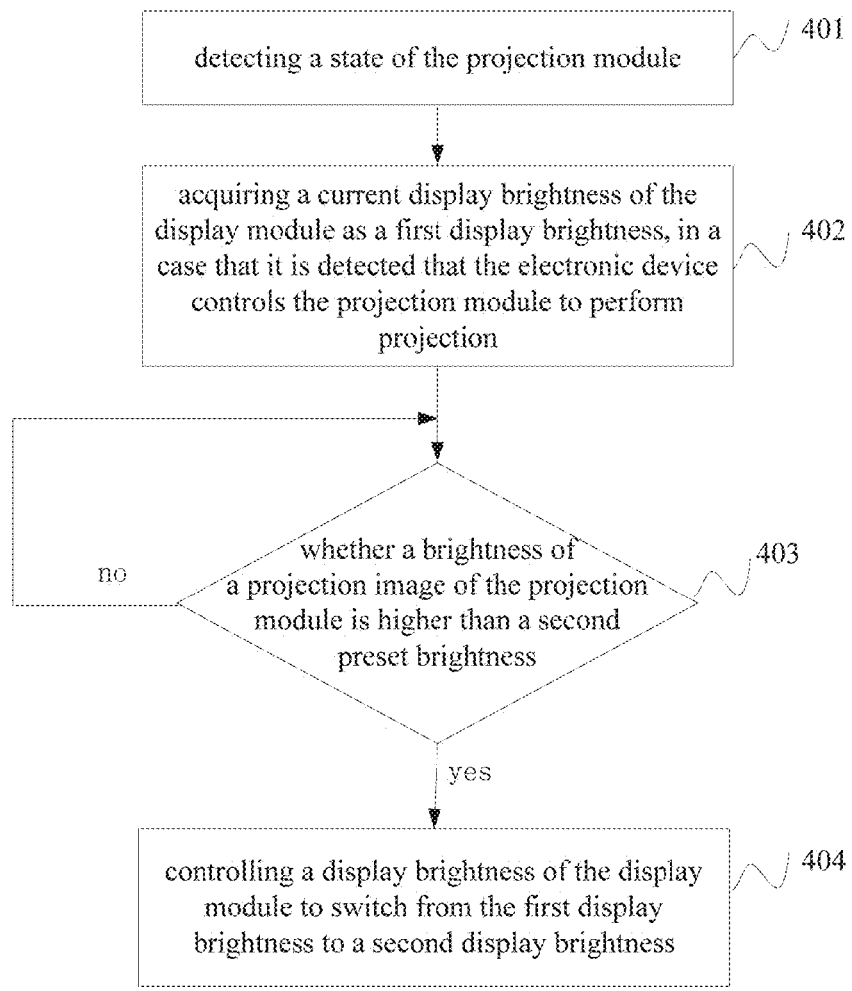
FIG. 4 is a flow chart of a control method according to another embodiment of the disclosure.

In the case that the electronic device uses the projection module to perform projection, the ambient brightness may change with a brightness of a projected image. In the case that the brightness of the projected image is high, the ambient brightness is relative high. In the conventional technology, a display brightness of the display module increases, which may cause an increased power consumption of the electronic device and a reduced resolution of the projected image due to the high display brightness of the display module. FIG. 4 is a flow chart of a control method according to another embodiment of the disclosure.

The method may include the following steps 401 to 404.

Step 401 includes: detecting a state of the projection module.

Step 402 includes: acquiring a current display brightness of the display module as a first display brightness in the case that it is detected that the electronic device controls the projection module to perform projection.

Step 403 includes: determining whether a brightness of a projected image from the projection module is higher than a second preset brightness, and going to step 404 in the case of positive determination.

Step 404 includes: controlling a display brightness of the display module to switch from the first display brightness to a second display brightness.

The second display brightness is lower than the first display brightness and is lower than the second preset brightness.

According to the embodiment, while the projection module performs projection, the display brightness of the display module may be controlled to switch from the first display brightness to the second display brightness to reduce the display brightness of the display module, if the brightness of the projected image from the projection module is higher than the second preset brightness, thereby reducing a power consumption for display, and saving a power consumption of the electronic device without affecting display and visibility of the projected image from the projection module.

If the electronic device detects that the projection module does not perform projection, the electronic device may adjust the display brightness of the display module according to an ambient brightness. In the case that the ambient brightness is high, the display brightness of the display module is increased, and in the case that the ambient brightness is low, the display brightness of the display module is reduced, to meet a user's visual requirements within a pre-determined power consumption.

According to above embodiments, in the case that it is detected that the electronic device controls the projection module to perform projection, the display brightness of the display module is controlled to switch from the first display brightness to the second display brightness which is lower than the first display brightness, to reduce a power consumption for display.

As described above, to reduce the power consumption, the display brightness of the display module is reduced. Also, other display parameters of the display module may be adjusted to enable the display module to operate, with the adjusted display parameters, in a low power consumption, to reduce the power consumption for display caused by the display module. For example, a display resolution of the display module is adjusted, and the lower the resolution is, the lower the requirement on the power consumption of the electronic device is.

Accordingly, in the case that it is detected that the electronic device controls the projection module to perform projection, the method according to another embodiment further includes:

acquiring a current display resolution of the display module as a first display resolution; and controlling a display resolution of the display module to switch from the first display resolution to a second display resolution, where the second display resolution is lower than the first display resolution.

Therefore, the electronic device may have a reduced power consumption by reducing the display resolution of the display module.

For simplification, the methods according to the above embodiments are illustrated as a combination of a series of steps, but persons skilled in the art should know that the disclosure is not limited to the sequence of the described steps, because some steps may be performed in a different sequence or performed simultaneously within the disclosure. It should be understood by persons skilled in the art that the embodiments described in specifications are illustrative, and the relevant steps and modules may be optional.

Figure 5:
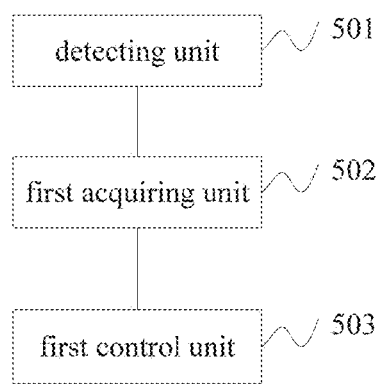
FIG. 5 is a schematic structural diagram of a control device according to an embodiment of the disclosure.

FIG. 5 is a schematic structural diagram of a control device according to an embodiment of the disclosure. An electronic device includes a display module and a projection module, and is capable of displaying output content through the display module or projecting the output content to a projection screen through the projection module.

The control device may be integrated, as a realizable function of a processor, in a processor of the electronic device, or is connected, as an independent module, to the processor of the electronic device.

The control device may include:

a detecting unit 501, configured to detect a state of the projection module;

a first acquiring unit 502, configured to acquire a current display brightness of the display module as a first display brightness, in the case that it is detected that the electronic device controls the projection module to perform projection; and a first control unit 503, configured to control a display brightness of the display module to switch from the first display brightness to a second display brightness.

The second display brightness is lower than the first display brightness.

According to the embodiment of the disclosure, it is detected that the electronic device controls the projection module to perform projection, and the first display brightness of the display module is switched to the second display brightness, which is lower than the first display brightness, to reduce the power consumption for display caused by the display module, thereby enabling the electronic device to operate in the reduced power consumption while the electronic device performs projection.

The first display brightness may refer to the current display brightness of the display module. The second display brightness may be any display brightness lower than the first display brightness, a display brightness lower than a preset value of the first display brightness, or a preset display brightness lower than the first display brightness.

As a possible implementation, the second display brightness is 0.

Figure 6:
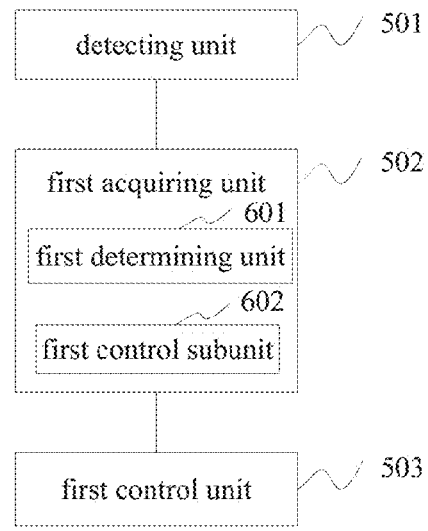
FIG. 6 is a schematic structural diagram of a control device according to another embodiment of the disclosure.

FIG. 6 is a schematic structural diagram of a control device according to another embodiment of the disclosure. The control device may include a detecting unit 501, a first acquiring unit 502 and a first control unit 503, and functions for each unit may refer to those according to the embodiment of FIG. 5.

Being different from the embodiment as shown in FIG. 5, the first control unit 503 of the control device as shown in FIG. 6 includes:

a first determining unit 601, configured to determine whether the first display brightness is lower than a first preset brightness; and a first control subunit 602, configured to control a display brightness of the display module to switch from the first display brightness to a second display brightness in the case that the first determining unit 601 determines that the first display brightness is not lower than the first preset brightness.

The second display brightness is lower than the first display brightness and is lower than the first preset brightness.

The first preset brightness may be determined based on a lowest brightness in which human eyes are able to have visual perception.

According to the embodiment, it is detected that the electronic device controls the projection module to perform projection, and the display brightness of the display module may be controlled to switch from the first display brightness to the second display brightness if the current first display brightness of the display module is not lower than the first preset brightness, to reduce the power consumption for display caused by the display module, thereby enabling the electronic device to operate in a saved power consumption for display while the electronic device uses the projection module to perform projection; or, in the case that the first display brightness of the display module is lower than the first preset brightness, the first display brightness of the current display module may be maintained, so that a user is able to make out display content of the display module.

Figure 7:
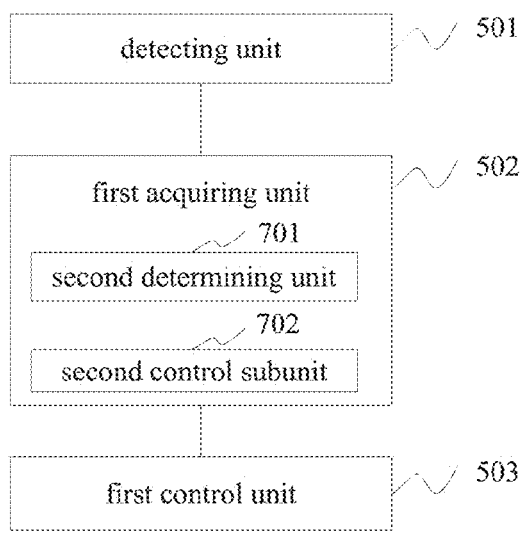
FIG. 7 is a schematic structural diagram of a control device according to another embodiment of the disclosure.

FIG. 7 is a schematic structural diagram of a control device according to another embodiment of the disclosure.

The control device includes a detecting unit 501, a first acquiring unit 502 and a first control unit 503, and functions for each unit may refer to those according to the embodiment of FIG. 5.

Being different from the embodiment as shown in FIG. 5, the first control unit 503 of the control device as shown in FIG. 7 includes:

a second determining unit 701, configured to determine whether a brightness of a projected image from the projection module is higher than a second preset brightness; and a second control subunit 702, configured to control a display brightness of the display module to switch from the first display brightness to a second display brightness, in the case that the second determining unit 701 determines that the brightness of the projected image from the projection module is higher than the second preset brightness.

The second display brightness is lower than the first display brightness and is lower than the second preset brightness.

According to the embodiment, while the projection module performs projection, the display brightness of the display module may be controlled to switch from the first display brightness to the second display brightness to reduce the display brightness of the display module, if the brightness of the projected image from the projection module is higher than the second preset brightness, thereby reducing power consumption for display, and saving a power consumption of the electronic device without affecting display and visibility of the projected image from the projection module.

If the control device detects that the projection module does not perform projection, the control device may adjust the display brightness of the display module according to an ambient brightness. In the case that the ambient brightness is high, the display brightness of the display module is increased, and in the case that the ambient brightness is low, the display brightness of the display module is reduced, to meet a user's visual requirements within a pre-determined power consumption.

Based on the above embodiments, the control device according to another embodiment may further include:

a second acquiring unit, configured to acquire a current display resolution of the display module as a first display resolution; and a second control unit, configured to control a display resolution of the display module to switch from the first display resolution to a second display resolution, where the second display resolution is lower than the first display resolution.

The electronic device may have a reduced power consumption by reducing the display resolution of the display module.

It should also be illustrated that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only include the factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

According to the description of the disclosed embodiments, the disclosure may be implemented or used by the persons of skill in the art. Various modifications made to these embodiments are apparent for the persons of skill in the art, and a normal principle defined in the disclosure may be implemented in other embodiments without departing from spirit or scope of the disclosure. Therefore the disclosure is not limited to the embodiments described in the disclosure but confirms to a widest scope in accordance with principles and novel features disclosed in the disclosure.

What is claimed is:

1. A control method, applied to an electronic device comprising a display module and a projection module, comprising:
    detecting a state of the projection module;
    acquiring a display brightness of the display module as a first display brightness, in the case that it is detected that the projection module is controlled to perform projection;
    controlling the display brightness of the display module to switch from the first display brightness to a second display brightness, wherein the second display brightness is lower than the first display brightness;
    wherein the controlling the display brightness of the display module to switch from the first display brightness to the second display brightness comprises:
        determining whether a brightness of a projected image from the projection module is higher than a preset brightness; and
        controlling the display brightness of the display module to switch from the first display brightness to the second display brightness, in the case of positive determination.

2. The control method according to claim 1, wherein the controlling the display brightness of the display module to switch from the first display brightness to the second display brightness comprises:
    determining whether the first display brightness is lower than a first preset brightness; and
    controlling the display brightness of the display module to switch from the first display brightness to the second display brightness, which is lower than the first preset brightness, in the case of negative determination.

3. The control method according to claim 2, further comprising:
    acquiring a display resolution of the display module as a first display resolution; and
    controlling the display resolution of the display module to switch from the first display resolution to a second display resolution, wherein the second display resolution is lower than the first display resolution.

4. The control method according to claim 2, wherein the second display brightness is a preset display brightness or a display brightness lower than a preset value of the first display brightness.

5. The control method according to claim 1, wherein the second display brightness is a preset display brightness or a display brightness lower than a preset value of the first display brightness.

6. The control method according to claim 1, further comprising:
    acquiring a display resolution of the display module as a first display resolution; and
    controlling the display resolution of the display module to switch from the first display resolution to a second display resolution, wherein the second display resolution is lower than the first display resolution.

7. The control method according to claim 1, wherein the second display brightness is a preset display brightness or a display brightness lower than a preset value of the first display brightness.

8. An electronic device, comprising:
    a display module for displaying output content;
    a projection module for projecting the output content to a projection screen; and
    a control device configured to:
        detect a state of the projection module;
        acquire a display brightness of the display module as a first display brightness in the case that it is detected that the projection module is controlled to perform projection;
        control the display brightness of the display module to switch from the first display brightness to a second display brightness, wherein the second display brightness is lower than the first display brightness;
    wherein the control device is configured to:
        determine whether a brightness of a projected image from the projection module is higher than a preset brightness; and control the display brightness of the display module to switch from the first display brightness to the second display brightness in the case that the control device determines that the brightness of the projected image from the projection module is higher than the second preset brightness.

9. The electronic device according to claim 8, wherein the control device is configured to:
  determine whether the first display brightness is lower than a first preset brightness; and
  control the display brightness of the display module to switch from the first display brightness to the second display brightness, which is lower than the first preset brightness, in the case that the control device determines that the first display brightness is not lower than a first preset brightness.

10. The electronic device according to claim 9, wherein the control device is further configured to:
  acquire a display resolution of the display module as a first display resolution; and
  control the display resolution of the display module to switch from the first display resolution to a second display resolution, wherein the second display resolution is lower than the first display resolution.

11. The electronic device according to claim 9, wherein the second display brightness is a preset display brightness or a display brightness lower than a preset value of the first display brightness.

12. The electronic device according to claim 8, wherein the second display brightness is a preset display brightness or a display brightness lower than a preset value of the first display brightness.

13. The electronic device according to claim 8, wherein the control device is further configured to:
  acquire a display resolution of the display module as a first display resolution; and
  control the display resolution of the display module to switch from the first display resolution to a second display resolution, wherein the second display resolution is lower than the first display resolution.

14. The electronic device according to claim 8, wherein the second display brightness is a preset display brightness or a display brightness lower than a preset value of the first display brightness.

* * * * *